(12) United States Patent  (10) Patent No.: US 7,159,936 B2
Bigolin                    (45) Date of Patent:    Jan. 9, 2007

(54) ENHANCED-COMFORT CYCLE SADDLE CONSTRUCTION

(75) Inventor: Riccardo Bigolin, Rossano Veneto (Vicenza) (IT)

(73) Assignee: Selle Italia S.r.l., Rossano Veneto (Vicenza) (IT)

( * ) Notice: Subject to any disclaimer, the term of this patent is extended or adjusted under 35 U.S.C. 154(b) by 0 days.

(21) Appl. No.: 11/270,302

(22) Filed: Nov. 9, 2005

(65) Prior Publication Data

US 2006/0119148 A1    Jun. 8, 2006

(30) Foreign Application Priority Data

Nov. 22, 2004  (IT)  .............................. MI04A2261

(51) Int. Cl.
*B62J 1/18*    (2006.01)
(52) U.S. Cl. ..................................... 297/214
(58) Field of Classification Search ............... 297/214, 297/195.1, 452.41; 5/909, 655.5, 654
See application file for complete search history.

(56) References Cited

U.S. PATENT DOCUMENTS

| 4,842,330 | A | * | 6/1989 | Jay ................................ 297/4 |
| 5,028,468 | A | * | 7/1991 | Taylor ......................... 428/71 |
| 5,108,076 | A | * | 4/1992 | Chiarella ..................... 297/214 |
| 6,026,527 | A | * | 2/2000 | Pearce ........................... 5/654 |
| 6,942,291 | B1 | * | 9/2005 | Yu ............................... 297/200 |
| 2004/0211005 | A1 | * | 10/2004 | Kuo ........................... 5/655.5 |
| 2005/0177946 | A1 | * | 8/2005 | Riley ............................. 5/638 |

* cited by examiner

*Primary Examiner*—Milton Nelson, Jr.
(74) *Attorney, Agent, or Firm*—Hedman & Costigan; James V. Costigan

(57) ABSTRACT

An enhanced-comfort cycle saddle construction comprises a substantially rigid saddle framework including fasteners for coupling the saddle to the saddler pillar and coated by an outer coating layer, between the saddle framework and outer coating layer one or more gel layers, including throughgoing holes, being provided.

2 Claims, 3 Drawing Sheets

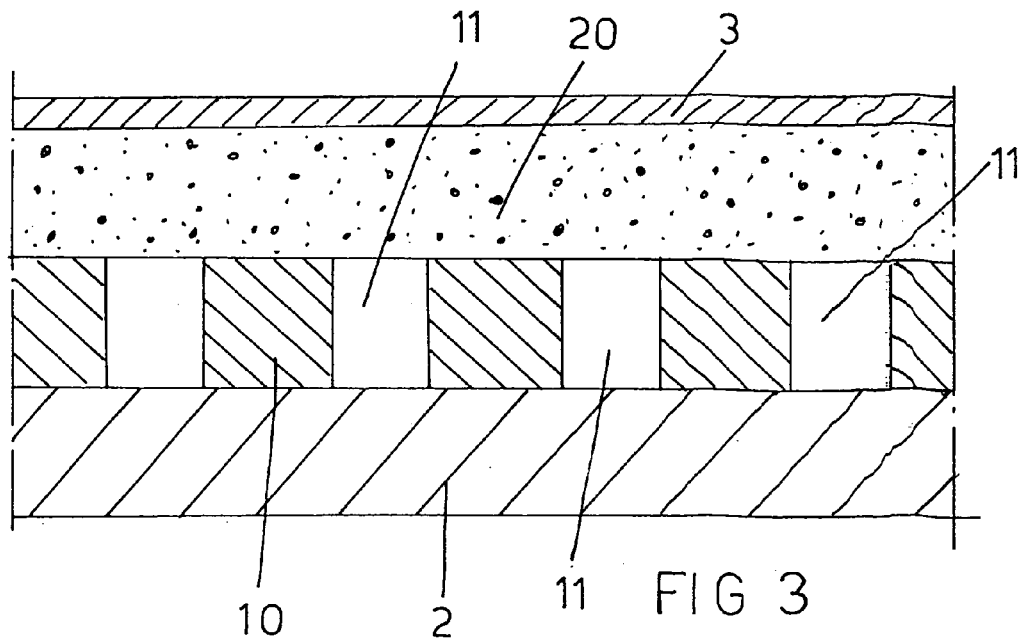
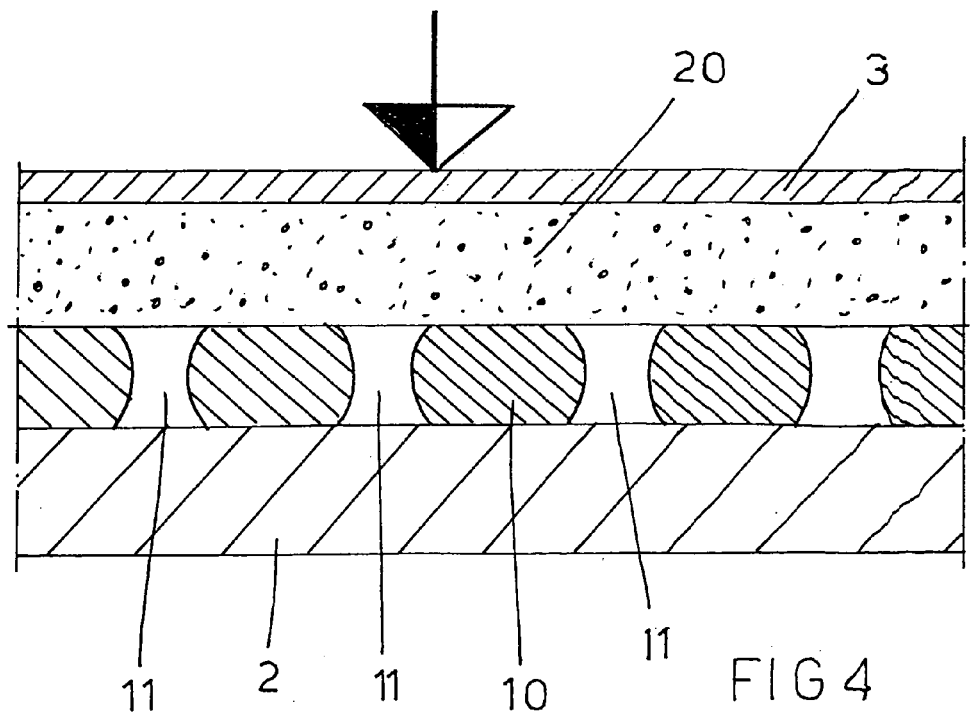

ENHANCED-COMFORT CYCLE SADDLE CONSTRUCTION

BACKGROUND OF THE INVENTION

The present invention relates to an enhanced-comfort cycle saddle construction.

As is known, conventional saddles for cycles and the like are made of a saddle framework, thereon is arranged a padding, generally made of a foamed plastic material, the top of which is covered or coated by an outer covering or coating protective layer.

Though the above saddle constructions have been universally adopted, they are not always suitable to provide optimum supporting characteristics, and a perfect anatomic fitting to the user body.

Thus, for the above mentioned reasons, prior cycle saddles may, in a lot of cases, cause irritations.

SUMMARY OF THE INVENTION

Accordingly, the aim of the present invention is to solve the above mentioned problem, by providing an enhanced-comfort cycle saddle construction, having optimum supporting features for the user, and with a suitable force distribution allowing said saddle to assume optimum anatomic characteristics.

Within the scope of the above mentioned aim, a main object of the invention is to provide a cycle saddle construction which can be controllably deformed as pressure is applied thereon by a user's body, with a consequent absorption of impacts, to provide the user with enhanced comfort.

Another object of the present invention is to provide such a cycle saddle construction which is very reliable and safe in operation.

Yet another object of the present invention is to provide such a cycle saddle construction which can be easily made and which, moreover, is very competitive from a mere economic standpoint.

According to one aspect of the present invention, the above mentioned aim and objects, as well as yet other objects, which will become more apparent hereinafter, are achieved by an enhanced-comfort cycle saddle construction comprising a substantially rigid saddle framework including coupling means for coupling said saddle construction to a saddle pillar, and being coated by an outer coating layer, characterized in that said cycle saddle construction comprises moreover, between said saddle framework and outer coating layer, a gel layer including a plurality of throughgoing holes.

BRIEF DESCRIPTION OF THE DRAWINGS

Further characteristics and advantages of the enhanced-comfort cycle saddle construction according to the present invention will become more apparent hereinafter from the following detailed disclosure of a preferred embodiment thereof, which is illustrated, by way of an indicative, but not limitative, example in the accompanying drawings, where:

FIG. 3 shows, on an enlarged scale, the gel layer detail arranged on the cycle saddle construction framework; and FIG. 4 shows a deforming of the gel layer as it is pressed by a user seating on the saddle.

DESCRIPTION OF THE PREFERRED EMBODIMENT

With reference to the number references of the above mentioned figures, the enhanced-comfort cycle saddle construction according to the invention, which has been generally indicated by the reference number 1, comprises a saddle framework 2, which is made of a plastic material and has a typical configuration of a sole.

The saddle framework 2 comprises a plurality of coupling means (not shown) for coupling said framework to the saddle pillar and is covered or coated by an outer coating layer 3 which, preferably though not necessarily, is made of a leather or other synthetic material.

A main feature of the invention is that between the saddle framework and outer coating layer is arranged a continuous gel layer, generally indicated by the reference number 10, which is applied substantially to the middle portion of the saddle, both in its crosssection and in its longitudinal section.

Figure 1:
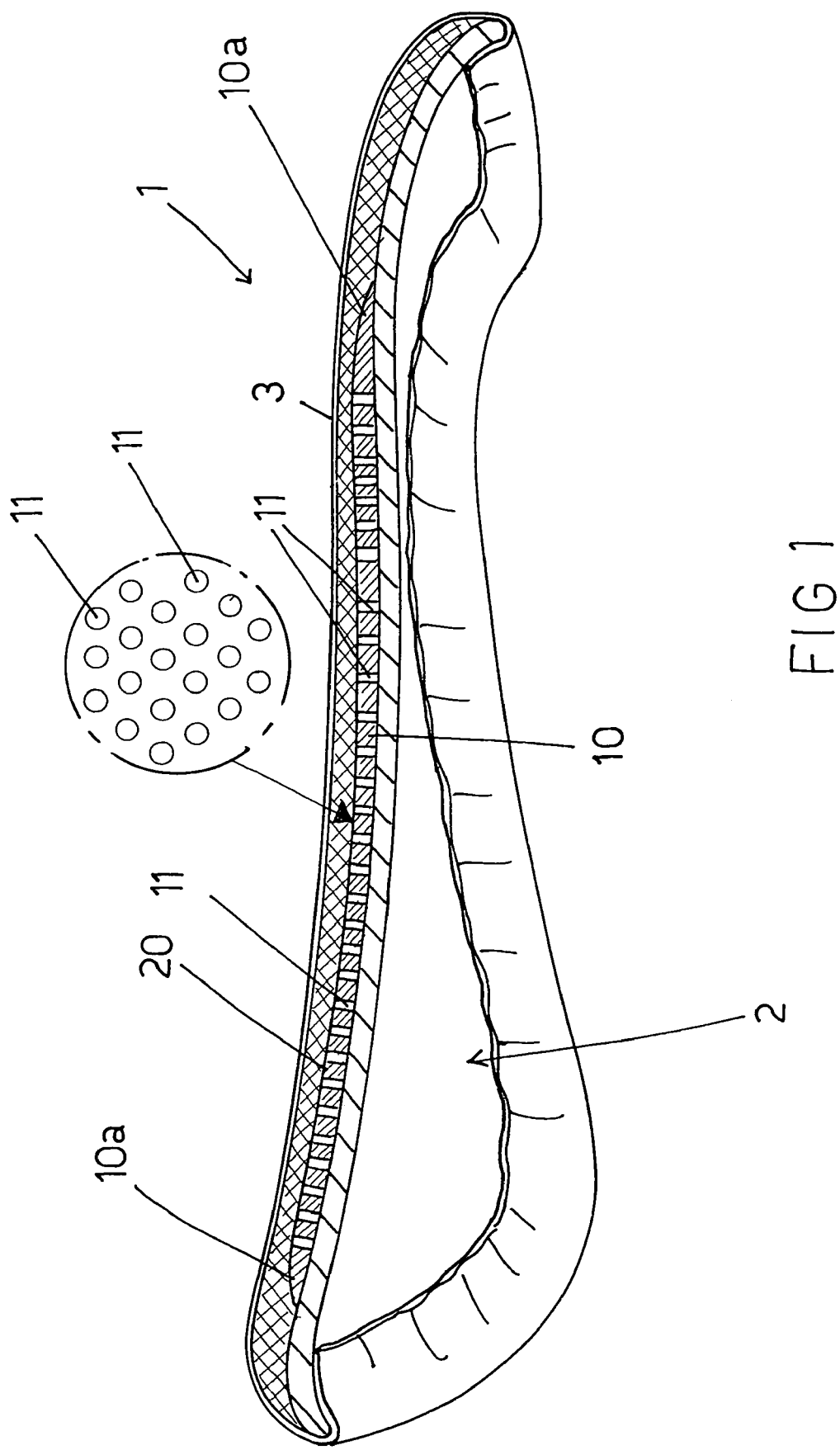
FIG. 1 is a longitudinal cross-sectional view showing the cycle saddle construction according to the invention.
Figure 2:
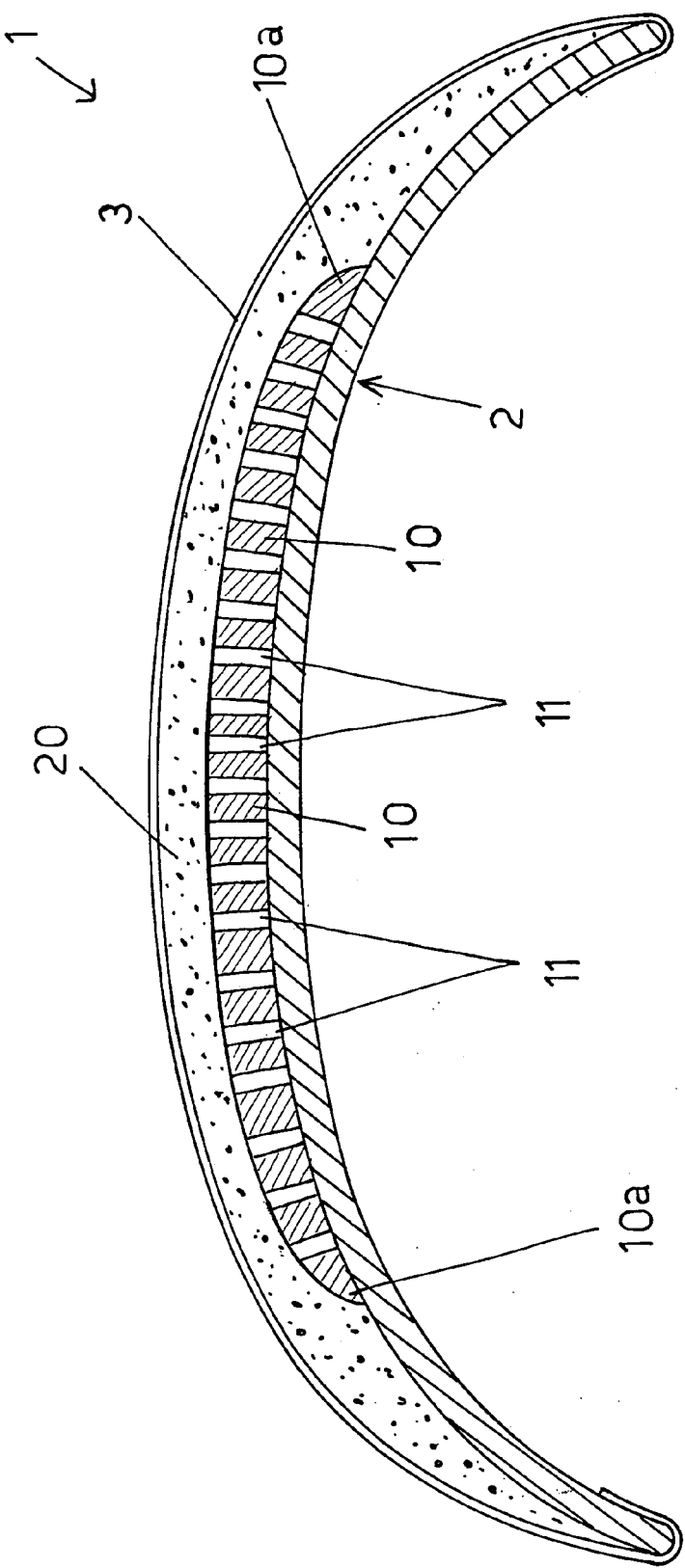
FIG. 2 is a cross-sectional view showing the cycle saddle construction according to the invention.

As shown in FIG. 2, the outer coating layer 3 has, in cross section, a curved contour and the gel layer 10 also has a curved contour which has substantially the same curvature of the coating layer with rounded end portions 10a, thereby the thickness of the gel layer progressively decreases from its middle part to its ends 10a. A further main feature of the invention is that the gel layer comprises a plurality of throughgoing holes 11.

It should be pointed out that the above mentioned gel layer affects the saddle surface and that the mentioned throughgoing holes can be formed either through the overall surface or a portion thereof.

Said gel layer directly contacts a rigid surface, which is designed for properly reacting against the pressure forces applied as the saddle is used.

This means that, if the material is pressed against a rigid surface, it, instead of being notched, is cross-wise deformed.

Thus, to the pressure force will not correspond a like and opposite force, but a deformation will be generated adapted to transform the vertical work into a horizontal work, thereby reducing the return of the vertical work or operating force toward its application point.

The mentioned holes operate to increase the tridimentional properties of the material, thereby facilitating a lateral displacement of the latter.

In this connection, it should be apparent that said hiles 11 could have any desired geometrical shape and depth. For example in FIG. 3 the holes 11 are sub-substantially cylindrical holes, whereas in FIG. 4 the holes 11 have a substantially inward bulged wall configuration.

Said gel can be either of a foamed type or of a non-foamed type.

The perforated layer comprises a tridimensional material, similar to a gel or equal to a gel.

As a user sits on the saddle and provides a pressure thereon, then, the solid part made of said gel can be bulged at said holes 11, thereby allowing the forces or pressures to be optimally absorbed, with a consequent enhanced use comfort.

The subject saddle can also comprise a padding layer 20, arranged between the gel layer and the outer coating or covering layer 3.

Said padding layer can advantageously comprise a polyvinyl material and can affect substantially the overall region of the saddle framework.

From the above disclosure it should be apparent that the invention fully achieves the intended aim and objects.

In fact, the invention provides an enhanced comfort saddle which, by using a perforated gel layer, allows to properly absorb the pressure forces thereon, thereby assuring an improved distributing of the sitting pressure; moreover, any vibrations susceptible to be transmitted to the user will be eliminated.

The invention, as disclosed, is susceptible to several modifications and variations, all of which will come within the scope of the invention.

Moreover, all the constructional details can be replaced by other technically equivalent elements.

In practicing the invention, the used materials, as well as the contingent size and shapes can be any, depending to requirements.

The invention claimed is:

1. An enhanced comfort cycle saddle construction, comprising a substantially rigid saddle framework coated by an outer coating layer having a curved convex contour and, between said saddle framework and the outer coating layer, a gel layer having a middle portion and end portions, said gel layer being a continuous gel layer applied substantially to a middle portion of said saddle both in a cross direction and in a longitudinal direction of said saddle, wherein said gel layer comprises a plurality of throughgoing holes and has an outer surface having an undepressed convex contour substantially corresponding to said curved convex contour of said outer coating layer, and wherein said gel layer has a thickness decreasing from said middle portion to said end portions thereof.

2. A cycle saddle construction, according to claim 1, wherein said throughgoing holes are formed either through all of said gel layer or only through at least a portion of said gel layer.

* * * * *